Patented May 7, 1940

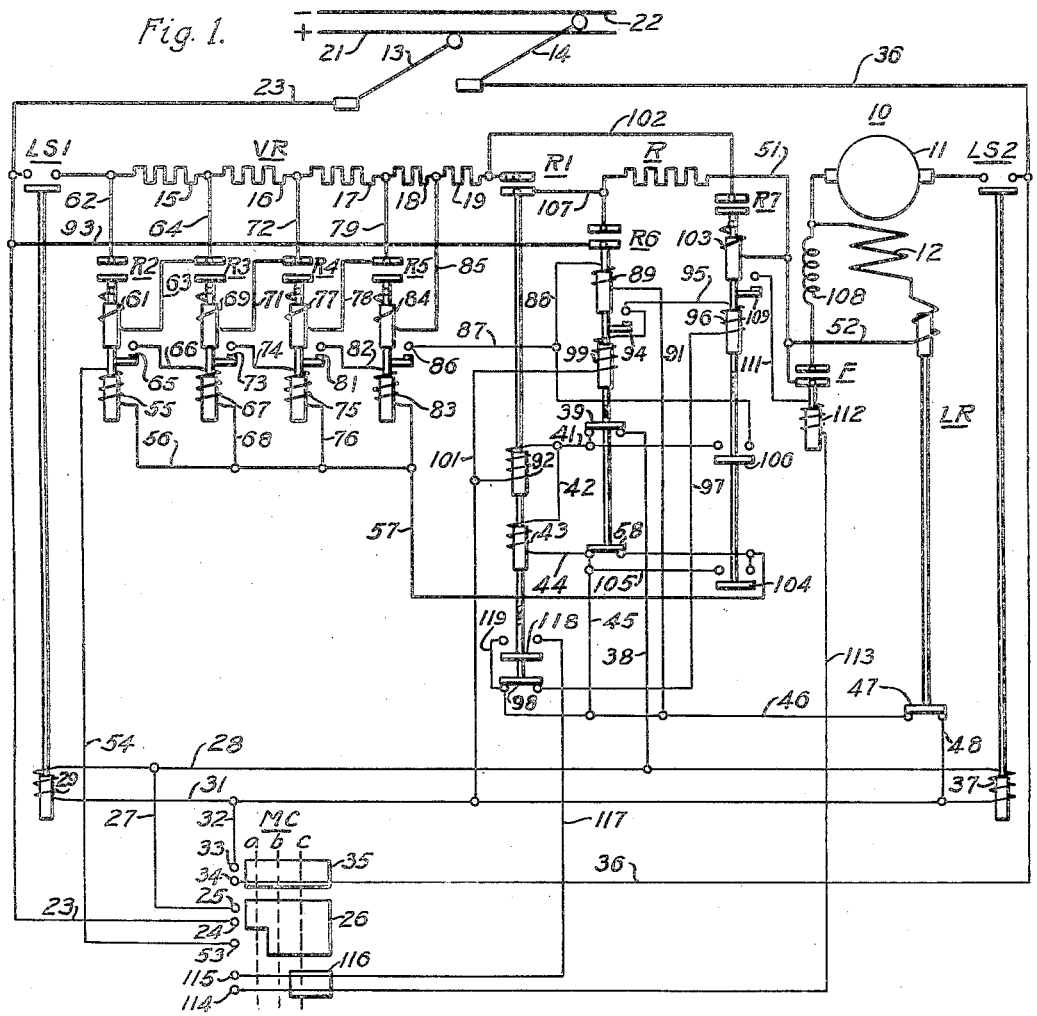

2,200,072

UNITED STATES PATENT OFFICE 2,200,072

MOTOR CONTROL SYSTEM

Bascum O. Austin, Wilkinsburg, and Graham L. Moses, Pittsburgh, Pa., assignors to Westinghouse Electric & Manufacturing Company, East Pittsburgh, Pa., a corporation of Pennsylvania Application June 28, 1938, Serial No. 216,278

10 Claims. (Cl. 172—179)

Our invention relates, generally, to motor control systems and, more particularly, to systems for controlling the operation of the propelling motors of electric vehicles, such as, for example, trolley coaches.

An object of our invention, generally stated, is to provide a control system for an electrically-propelled vehicle which shall be simple and efficient in operation and which may be economically manufactured and installed.

A more specific object of our invention is to reduce the amount of control equipment and wiring required for controlling the operation of an electric vehicle.

Another object of our invention is to provide a simplified method of interlocking the control circuits of a motor control system to insure the correct sequence of control.

A further object of our invention is to utilize series holding coils on the motor accelerating switches of a motor control system.

Still another object of our invention is to provide a motor control system in which the motor accelerating switches are progressively energized by energy taken directly from the switch frame.

Other objects of our invention will be explained fully hereinafter or will be apparent to those skilled in the art.

According to our invention the operation of the motor accelerating switches in a motor control system is controlled by interlock progression, the closing coil of each switch being energized by line potential taken directly from the frame of the preceding switch in the progression. Certain of the accelerating switches are provided with the usual closing coil for operating the switch and also a series holding coil for retaining it in the closed position, and the switches are so disposed in the system that the current always flows through them in the same direction.

For a fuller understanding of the nature and objects of our invention, reference may be had to the following detailed description, taken in conjunction with the accompanying drawing, in which:

Figure 1 is a diagrammatic view of a control system embodying our invention, and Fig. 2 is a chart showing the sequence of operation of a portion of the apparatus illustrated in Fig. 1.

Referring to the drawing, the system shown there comprises a motor 10, having an armature winding 11 and a series field winding 12, line switches LS1 and LS2 for connecting the motor to the current collecting devices 13 and 14, respectively, a vernier resistor VR, which is subdivided into a plurality of sections 15 to 19, inclusive, and an additional resistor R for controlling the motor current during acceleration of the motor 10, a plurality of accelerating switches R1, R2, R3, R4, R5, R6 and R7 for controlling the resistor connections, a field shunting switch F, a master controller MC and a limit relay LR for automatically controlling the acceleration of the motor.

The motor 10 may be of a type suitable for propelling an electric vehicle, as, for example, a trolley coach (not shown). The power for operating the motor may be supplied from any suitable source through power conductors 21 and 22 which are engaged by the current collecting devices 13 and 14, respectively.

In order to increase the smoothness of operation of the vehicle during the accelerating period, the resistors VR and R are first connected in series-circuit relation and the accelerating switches operated in one sequence to shunt the vernier resistor VR from the motor circuit, after which the resistors VR and R are connected in parallel-circuit relation and the accelerating switches then operated in a different sequence to shunt the resistors from the motor circuit step-by-step, thereby increasing the number of accelerating steps obtained with a certain number of accelerating switches. In this manner a large number of accelerating steps may be obtained without materially increasing the control equipment required, thereby keeping the space necessary for the equipment and the weight and cost of the equipment at a minimum.

With a view to simplifying the equipment and wiring necessary for controlling the operation of the vehicle, each one of the accelerating switches is provided with a closing coil for operating the switch and a holding coil for retaining the switch in the closed position and the sequence of operation of the switches is controlled by interlocks on the switches instead of by the usual sequence drum. Furthermore, the switches are so constructed that the interlocks are energized by the line potential which is taken directly from the power source through the switch structure, thereby simplifying the switch structure and also reducing the amount of wiring required for connecting the apparatus in the system.

In order to simplify the equipment further, the holding coils on a majority of the accelerating switches are of the series type and the coil on each switch is energized by the current flowing through the contact members of that switch, thereby making it possible to connect one terminal of the series holding coil directly to the switch structure which reduces the wiring for the equipment. Furthermore, the utilization of the series holding coils precludes opening of the switches while carrying current, thereby making it unnecessary to provide arc chutes and blow-out coils on the accelerating switches.

To insure that the series holding coils on the accelerating switches will function properly, the switches are so disposed in the system that the current always flows through the contact members of the switches and the holding coils in the same direction. In this manner, the current flowing through the holding coils is of the proper polarity and, furthermore, the interlocks on the switches which are connected directly to the switch frame are energized by the line potential at all times when the switches are closed.

In order that the functioning of the foregoing apparatus may be more clearly understood, the operation of the system will now be described in more detail.

Assuming that it is desired to accelerate the vehicle at the maximum rate, the master controller MC is advanced to position c, thereby closing the switches LS1, LS2 and R1, as indicated in the sequence chart shown in Fig. 2. The energizing circuit for the actuating coil of the switch LS1 may be traced from the positive conductor 21 through the current collecting device 13, conductor 23, contact fingers 24 and 25 bridged by the contact segment 26 on the controller MC, conductors 27 and 28, the actuating coil 29 of the switch LS1, conductors 31 and 32, contact fingers 33 and 34 bridged by a segment 35, conductor 36 and the current connecting device 14 to the negative conductor 22. The energizing circuit for the switch LS2 extends from the previously energized conductor 28 through the actuating coil 37 of the switch LS2 to the conductor 31 and thence through the circuit previously traced to the negative conductor 22. The energizing circuit for the closing coil of the switch R1 extends from the previously energized conductor 28 through conductor 38, an interlock 39 on the switch R6, conductors 41 and 42, the closing coil 43 of switch R1, conductors 44, 45 and 46, contact members 47 of the limit relay LR, conductor 48 to conductor 31 and thence through the circuit previously traced to the negative conductor 22.

The closing of the switches LS1, LS2 and R1 connects the motor 10 to the power source through the resistors VR and R which are connected in series-circuit relation. The motor circuit may be traced from the positive conductor 21 through the current collecting device 13, conductor 23, the switch LS1, the resistor VR, the switch R1, the resistor R, conductors 51 and 52, the actuating coil of the limit relay LR, the field winding 12, the armature winding 11 of the motor 10, the switch LS2, the conductor 36 and the current collecting device 14 to the negative conductor 22.

Since it has been assumed that the master controller MC is advanced to the last position, the switch R2 will be closed as soon as the motor current is reduced to a value which will permit the contact members 47 of the limit relay LR to close. It will be understood that the limit relay is actuated to its uppermost position when power is applied to the motor in view of the initial rush of current and that this relay will drop to its lowermost position when the current is reduced by the counter E. M. F. of the motor in a manner well known in the art. The energizing circuit for the closing coil of the switch R3 may be traced from a contact finger 53, which engages the segment 26 on the controller MC, through conductor 54, the closing coil 55 of the switch R2, conductors 56 and 57, an interlock 58 on the switch R6, conductors 45 and 46, the contact members 47 of the limit relay LR and thence through a circuit previously traced to the negative conductor 22.

The closing of the switch R3 shunts the resistor section 15 from the motor circuit. Furthermore, the series holding coil 61 of the switch R2 is energized at this time, since it is connected in the shunting circuit established by the closing of the main contact members of the switch R2. The shunting circuit may be traced from the one terminal of the resistor 15 through conductor 62, the contact members of the switch R2, the series holding coil 61, one terminal of which is connected to the switch structure as shown, conductor 63, the upper contact member of the switch R3 and conductor 64 to the other terminal of the resistor 15. The energization of the holding coil 61 retains the switch R2 in the closed position while the motor current is flowing through the main contact members of the switch R2.

At this time an interlock 65 on the switch R2 is also energized by energy taken directly through the switch structure and this interlock is closed to energize the closing coil of the switch R3 which will be closed to accelerate the motor as soon as the contact members of the limit relay LR are closed. The energizing circuit for the closing coil of the switch R3 extends from the line potential interlock 65 on the switch R2 through conductor 66, the closing coil 67 and a conductor 68 to the conductor 56 and thence through a circuit previously traced to the negative conductor 22.

The closing of the switch R3 shunts the resistor section 16 from the motor circuit and also energizes the series holding coil for the switch through a circuit which may be traced from one terminal of the resistor 16 through conductor 64, the contact members of the switch R3, the series holding coil 69, conductors 71 and 72 to the other terminal of the resistor 16. In this manner, the switch R3 is held closed by the motor current. Also a circuit is established for the closing coil of the switch R4. This circuit may be traced from a line potential interlock 73 on the switch R3 through conductor 74, closing coil 75 and conductor 76 to the conductor 56 and thence through the negative conductor 22 through the circuit previously traced.

The switch R4 is closed upon the closing of the contact members of the limit relay LR, as explained hereinbefore, thereby shunting the resistor 17 from the motor circuit and also energizing the series holding coil on the switch R4. The shunting circuit may be traced from one terminal of the resistor 17 through the conductor 72, the contact members of the switch R4, the series holding coil 77 and conductors 78 and 79 to the other terminal of the resistor 17.

At this time the closing coil of the switch R5 is energized through a circuit which may be traced from a line potential interlock 81 on the switch R4 through conductor 82, a closing coil 83 of the switch R5, the conductor 57 and thence through the contact members of the limit relay LR to the negative conductor 22 through circuits previously traced.

Likewise the closing of the switch R5 shunts the resistor 18 from the motor circuit and also energizes the series holding coil on the switch R5. The shunting circuit may be traced from one terminal of the resistor 18 through conductor 79, the contact members of the switch R5, the series holding coil 84 and conductor 85 to the other terminal of the resistor 18.

The closing of the switch R5 also establishes an energizing circuit for the closing coil of the switch R6 which extends from a line potential interlock 86 on the switch R5 through conductors 87 and 88, the closing coil 89 of the switch R6 and conductor 91 to the conductor 46 and thence through the contact members 47 of the limit relay LR and a circuit previously traced to the negative conductor 22.

The closing of the switch R6 shunts the resistor section 19 and also the switches R2, R3, R4 and R5 from the motor circuit, thereby deenergizing the series holding coils on these switches and permitting them to open. Furthermore, the closing of the switch R6 opens the interlock 39 on this switch, thereby deenergizing the holding coil 92 on the switch R1 which permits this switch to open. Thus, the resistor R is connected in the motor circuit which now extends from the conductor 23 through conductor 93, the switch R6, the resistor R, the conductors 51 and 52, the limit relay LR, the field winding 12, the armature winding 11, the switch LS2, conductor 36 and the current collector 14 to the negative conductor 22.

The closing of the switch R6 and the opening of the switch R1 also establishes an energizing circuit for the closing coil of the switch R7 which may be traced from a line potential interlock 94 on the switch R6, conductor 95, the closing coil 96 on the switch R7, conductor 97, an interlock 98 on the switch R1, conductor 46, the contact members 47 of the limit relay LR and thence to the negative conductor 22 as previously traced. At this time a circuit is also established for the holding coil of the switch R6 which extends from the interlock 94 through the holding coil 99 and conductor 101 to the conductor 31 and thence through the circuit previously traced to the negative conductor 22.

The closing of the switch R7 connects the resistors VR and R in parallel-circuit relation in the motor circuit, thereby further decreasing the effective resistance in the motor circuit. The circuit through the resistor VR may be traced from the conductor 23 through the switch LS1, the resistor VR, conductor 102, the switch R7 and the series holding coil 103 to the conductor 51 and thence through the motor 10, as previously traced. The circuit through the resistor R extends from the conductor 23 through conductor 93, the switch R6 and the resistor R to the conductor 51 and thence through the motor, as previously described. The energization of the holding coil 103 on the switch R7 retains this switch in the closed position.

The closing of the switch R7 also establishes an energizing circuit for the closing coil of the switch R2, thereby reclosing this switch as indicated in the sequence chart shown in Fig. 2. The energizing circuit for the switch R2 may be traced from the contact finger 53 on the master controller MC through conductor 54, the coil 55, conductors 56 and 57, an interlock 104 on the switch R7, conductors 105, 45 and 46 to the contact members 47 of the limit relay LR and thence through the circuit previously traced to the negative conductor 22. In this manner the switch R2 is closed to shunt the resistor section 15 from the motor circuit and also to energize the series holding coil 61 of the switch R2 in the manner hereinbefore described.

Likewise, the switches R3, R4 and R5 are closed in sequential relation by the energization of their closing coils through the line potential interlocks on the preceding switch in the manner hereinbefore described, thereby shunting the resistors 16, 17 and 18 from the motor circuit.

Following the closing of the switch R5, the closing coil of the switch R1 is energized through a circuit which may be traced from the line potential interlock 86 on the switch R5 through conductors 87 and 88, an interlock 106 on the switch R7, conductors 41 and 42, the closing coil 43, conductors 44, 45 and 46, the contact member 47 on the limit relay LR and thence to the negative conductors 22 as previously traced.

In this manner the switch R1 is closed to connect the motor 10 directly to the power source, the motor circuit now extending from the conductor 23 through conductor 93, the switch R6, conductor 107, the switch R1, conductor 102, the switch R7 and the series holding coil 103 to the conductor 51 and thence through the motor to the negative conductor 22, as previously described.

The closing of the switch R1 also establishes an energizing circuit for the actuating coil of the switch F, thereby closing this switch to shunt the motor field winding 12 through a reactor 108. The energizing circuit for the switch F may be traced from an interlock 109 on the switch R1 which is now energized directly from the power source through the switch frame, conductor 111, the coil 112 of the switch F, conductor 113, contact fingers 114 and 115 bridged by a contact segment 116 on the master controller MC, conductor 117, an interlock 118 on the switch R1, conductors 119 and 46 to the contact members 47 of the limit relay LR and thence to the negative conductor 22, as previously traced. In this manner the field strength of the motor 10 is reduced, thereby increasing the speed of the motor in a manner well known in the art.

The motor is now operating at maximum speed, since it is connected directly to the power source and the field excitation is reduced by the closing of the field shunting switch F. If it is desired to stop the vehicle, the motor may be disconnected from the power source by actuating the controller MC to the off position, thereby deenergizing the switches LS1 and LS2 which will open to interrupt the motor circuit. If it is not desired to obtain the maximum speed by utilizing the field shunting means, the controller MC may be actuated to position b, thereby permitting the accelerating resistors to be shunted from the motor circuit in the usual manner but not permitting the switch F to be closed.

From the foregoing description it is apparent that we have provided a control system which is particularly suitable for controlling the operation of trolley coaches or similar electric vehicles, since the amount of equipment and wiring on the vehicle is reduced by utilizing the line-potential interlocks and series holding coils as described, thereby decreasing the weight and cost of the equipment as well as the space required for the apparatus.

We do not desire to be restricted to the particular form or arrangement of parts herein shown and described, since it is evident that they may be changed and modified without departing from the spirit and scope of our invention as defined in the appended claims.

We claim as our invention:

1. In a motor control system, in combination, a motor, a source of power for the motor, means for connecting the motor to the power source, a plurality of resistors for controlling the motor current, a plurality of switches for controlling the resistor connections, said switches having series holding coils thereon, control means for initiating the operation of said switches, and interlocking means on said switches for causing them to be operated first in one sequence and then in another sequence to increase the number of accelerating steps, said switches being so disposed in the system that the current flows through the series holding coils in the same direction during each sequence of operation.

2. In a motor control system, in combination, a motor, a source of power for the motor, means for connecting the motor to the power source, a plurality of resistors for controlling the motor current, a plurality of switches for controlling the resistor connections, control means for initiating the operation of said switches, and interlocking means on said switches for controlling their sequence of operation, said interlocking means being energized from the power source directly through the switch structure, said switches having closing coils energized by the potential of the power source through said interlocking means and series holding coils energized by the motor current.

3. In a motor control system, in combination, a motor, a source of power for the motor, means for connecting the motor to the power source, a plurality of resistors for controlling the motor current, a plurality of switches for controlling the resistor connections, control means for initiating the operation of said switches, and interlocking means on said switches for controlling their sequence of operation, said switches having closing coils and series holding coils thereon, the series holding coil on each switch being energized by current flowing through the main contact members of said switch.

4. In a motor control system, in combination, a motor, a source of power for the motor, means for connecting the motor to the power source, a plurality of resistors for controlling the motor current, a plurality of switches for controlling the resistor connections, control means for initiating the operation of said switches, and interlocking means on said switches for controlling their sequence of operation, said switches having closing coils and series holding coils thereon, the series holding coil on each switch being energized by current flowing through the main contact members of said switch, said switches being so disposed in the system that the current always flows through said contact members in the same direction.

5. In a motor control system, in combination, a motor, a source of power for the motor, means for connecting the motor to the power source, a plurality of resistors for controlling the motor current, a plurality of switches for controlling the resistor connections, control means for initiating the operation of said switches, and interlocking means on said switches for controlling their sequence of operation, said switches having closing coils and series holding coils thereon, the series holding coil on each switch being energized by current flowing through the main contact members of said switch and the closing coil being energized through the interlocking means on another switch.

6. In a motor control system, in combination, a motor, a source of power for the motor, means for connecting the motor to the power source, a plurality of resistors for controlling the motor current, a plurality of switches for controlling the resistor connections, control means for initiating the operation of said switches, and interlocking means on said switches for controlling their sequence of operation, said switches having closing coils and series holding coils thereon, the series holding coil on each switch being energized by current flowing through the main contact members of said switch and the closing coil being energized through the interlocking means on another switch, said interlocking means being energized from the power source directly through the switch structure.

7. In a motor control system, in combination, a motor, a source of power for the motor, means for connecting the motor to the power source, a plurality of resistors for controlling the motor current, a plurality of switches for controlling the resistor connections, control means for initiating the operation of said switches, interlocking means on said switches for controlling their sequence of operation, said switches having closing coils and series holding coils thereon, the series holding coil on each switch being energized by current flowing through the main contact members of said switch and the closing coil being energized through the interlocking means on another switch, said interlocking means being energized from the power source directly through the switch structure, and relay means responsive to the motor current and cooperating with said interlocking means to control the energization of said closing coils.

8. In a motor control system, in combination, a motor, a source of power for the motor, means for connecting the motor to the power source, a plurality of resistors for controlling the motor current, a plurality of switches for controlling the resistor connections, control means for initiating the operation of said switches, interlocking means associated with said switches and cooperating with said control means for causing the switches to be operated first in one sequence and then in another sequence to increase the number of accelerating steps, each one of said switches having a closing coil and a series holding coil, and interlocks on said switches for energizing the closing coil of the next successive switch, said interlocks being energized from the power source through the switch structure, said series holding coils being energized by the motor current.

9. In a motor control system, in combination, a motor, a source of power for the motor, means for connecting the motor to the power source, a plurality of resistors for controlling the motor current, a plurality of switches for controlling the resistor connections, control means for initiating the operation of said switches, interlocking means associated with said switches and cooperating with said control means for causing the switches to be operated first in one sequence and then in another sequence to increase the number of accelerating steps, each one of said switches having a closing coil and a holding coil, the holding coil on each switch being energized by the current flowing through the main contact members of said switch.

10. In a motor control system, in combination, a motor, a source of power for the motor, means for connecting the motor to the power source, a plurality of resistors for controlling the motor current, a plurality of switches for controlling the resistor connections, control means for initiating the operation of said switches, interlocking means associated with said switches and cooperating with said control means for causing the switches to be operated first in one sequence and then in another sequence to increase the number of accelerating steps, each one of said switches having a closing coil and a holding coil, and interlocks on said switches for energizing the closing coil of the next successive switch, said interlocks being energized from the power source through the switch structure, the holding coil on each switch being energized by the current flowing through the main contact members of said switch, said switches being so disposed that the current always flows through their main contact members in the same direction.

BASCUM O. AUSTIN.
GRAHAM L. MOSES.